United States Patent
Trost

(10) Patent No.: US 7,909,384 B2
(45) Date of Patent: Mar. 22, 2011

(54) ACTUATION DEVICE FOR A FLAP ELEMENT

(75) Inventor: Daniel Trost, Osnabrück (DE)

(73) Assignee: Wilhelm Karmann GmbH, Osnabrück (DE)

( * ) Notice: Subject to any disclaimer, the term of this patent is extended or adjusted under 35 U.S.C. 154(b) by 593 days.

(21) Appl. No.: 10/592,983

(22) PCT Filed: Mar. 1, 2005

(86) PCT No.: PCT/DE2005/000337
§ 371 (c)(1),
(2), (4) Date: Jun. 6, 2008

(87) PCT Pub. No.: WO2005/092652
PCT Pub. Date: Oct. 6, 2005

(65) Prior Publication Data
US 2008/0238131 A1    Oct. 2, 2008

(30) Foreign Application Priority Data
Mar. 18, 2004    (DE) .................. 10 2004 013 403

(51) Int. Cl.
B60J 7/20    (2006.01)
(52) U.S. Cl. .................. 296/107.08; 296/37.5
(58) Field of Classification Search .................. 296/124, 296/107.08, 37.5, 37.1
See application file for complete search history.

(56) References Cited

U.S. PATENT DOCUMENTS

| 3,608,130 | A | * | 9/1971 | Rudnick .................. 16/335 |
| 4,100,648 | A |   | 7/1978 | Krautter |
| 4,654,930 | A | * | 4/1987 | Lautenschlager et al. ...... 16/288 |
| 5,810,413 | A |   | 9/1998 | Siring et al. |
| 5,855,408 | A | * | 1/1999 | Rickabus .................. 296/214 |
| 6,030,023 | A | * | 2/2000 | Guillez .................. 296/136.06 |
| 6,726,270 | B2 |   | 4/2004 | Meierhofer |
| 2008/0067832 | A1 |   | 3/2008 | Bunsmann et al. |

FOREIGN PATENT DOCUMENTS

| DE | 931 710 C | 8/1955 |
| DE | 25 30 320 A1 | 1/1977 |
| DE | 198 34 850 A1 | 2/2000 |
| DE | 200 12 866 U1 | 8/2001 |
| EP | 1 386 768 A1 | 2/2004 |
| EP | 1 228 914 B1 | 9/2007 |
| WO | 2005/049354 A1 | 6/2005 |

OTHER PUBLICATIONS

International Search Report for PCT/DE2005/000337.
International Preliminary Examination Report for PCT/DE2005/000337.

* cited by examiner

*Primary Examiner* — Glenn Dayoan
*Assistant Examiner* — Melissa A Black
(74) *Attorney, Agent, or Firm* — J-Tek Law PLLC; Jeffrey D. Tekanic

(57) ABSTRACT

An actuation device (30) for a flap element, in particular a variable top receptacle (20), having at least one wall element (22) that is pivotable between a first and a second position, wherein the actuation device comprises a fixedly borne spring element (34) and the spring element traverses a point of maximum deflection between its first and second position by interacting with the wall element (22) during pivoting of the wall element (22).

18 Claims, 3 Drawing Sheets

ACTUATION DEVICE FOR A FLAP ELEMENT

CROSS-REFERENCE

This application is the US national stage filing of International Application No. PCT/DE2005/000337 filed Mar. 1, 2005, which claims priority to German patent application no. 10 2004 013 403.0 filed Mar. 18, 2004.

TECHNICAL FIELD

1. Background Art

The invention relates to an actuation device for a flap element, in particular for a variable top receptacle, which actuation device assists the movement of a flap element respectively from a first position into a second position and from the second position into the first position.

Such top receptacles are provided in vehicles having a flap- or folding top in order to be able to better utilize the storage space located underneath the top receptacle when the vehicle is closed, i.e. in the state, in which the flap- or folding top is not loaded into the top receptacle. For this purpose, the top receptacle is brought into a high position, so that the largest possible volume for accommodating luggage pieces is provided underneath the variable top receptacle. On the other hand, when the flap- or folding top is opened, the flap- or folding top is deposited into the top receptacle that is shifted to a low position.

Other applications of the actuation device are, e.g., flap coverings of glove compartments, door pockets and center consoles.

An actuation apparatus for a variable top receptacle is known from DE 197 13 606 C1, which apparatus moves a top compartment floor that is formed from three plate-shaped wall elements. The movement is initiated by an angled handle that is accessible from the luggage space and is fixedly borne on one of the wall elements. One end of a pneumatic spring is attached to a further wall element; the other end of the pneumatic spring is pivotably borne on the chassis. The pneumatic spring assists the movement of the top receptacle from the low position to the high position, wherein at the beginning the movement is damped by the pneumatic spring. In addition, the actuation apparatus of DE 197 13 606 C1 includes a latching hook that is pivotable at the high position of the top receptacle into the latched position, thereby fixing the position of one of the wall elements in order to prevent movement of the top compartment floor. The latching hook is biased by an upper dead point spring alternatively either into the release position or into the latched position.

2. Summary

In one object of the present teachings, it is desired to provide an actuation device for a flap or wall element, which operates, e.g., with a convertible top receptacle that is variable in size, which actuation device is preferably compact, requires little installation space and is cost-effective.

This object is solved by the actuation device for a flap element of a variable top receptacle having at least one wall element that is pivotable between a first and a second position. The actuation device preferably comprises a fixedly borne spring element that traverses a point of maximum elastic deformation between its first and second position by interacting with the wall element during pivoting of the wall element.

In one aspect of the present teachings, actuation mechanisms, which utilize these pneumatic springs, can be replaced with a device that assists or supports at least a portion of the movement of the flap or wall element from the first position into the second position and vice versa and is also preferably capable of performing a flap- or wall-retaining function in the respective end positions. If one end of the spring element is stationary during the pivoting movement of the wall or flap element, it is not necessary to provide any space for pivoting of the end of the spring element and a bracket (if provided) supporting the spring element. Rather, the spring element can be compactly mounted at a location in the rear area of the vehicle, where the spring element can be accommodated with little interference.

As noted above, one end of the spring element is mounted so as to be stationary during the pivoting of the flap or wall element, preferably such that translational movements as well as rotational movements of the one end of the spring element at the mounted position are excluded. If the mounted position is provided, e.g., on the rear lid of the motor vehicle, it is understood that the spring element and/or the bracket (if provided) holding the spring element is (are) movable together with the rear lid, but is (are) not movable relative to each other. Moreover, an elastic deformation or deflection of the spring element is possible by applying force to the spring element. If for example the spring element traverses a point of maximum deflection along the path of the wall or flap element when it pivots between its first and second position, which deflection is generated by an interaction with the wall or flap element, the restoring force of the spring element is likewise a maximum at the point of maximum deflection. In fact, similar to the above-described known gas-spring actuation device, the present spring element imparts a counterbias to the movement direction at the beginning of the movement path of the wall or flap element, so that, in addition to the weight of the top receptacle, the spring force must be overcome until the point of maximum deflection is reached. However, the restoring force of the spring element then functions in an assisting manner, so that the restoring force of the spring element assists the further movement of the wall or flap element and ultimately holds the wall or flap element in the end position. The wall- or flap-retaining function of the spring force is based upon the fact that the force of the spring element must be again overcome in order to move away from the end position.

BRIEF DESCRIPTION OF THE DRAWINGS

An essentially unbiased or undeformed state in the first and second position of the wall element, i.e. in the end positions of the wall element, means that, in these positions, the spring element has the least amount of deformation or deflection that it experiences the along the path between the first and second position. Thus, this also includes a state, in which a biasing of the spring element is provided, wherein this biasing, however, represents the minimal value of the deflection or deformation and/or the restoring force along the path between the first and second position. Such a biasing is desirable in order to prevent an unintended release of the wall element from the respective end positions.

In the following, the invention will be described in an exemplary manner with the assistance of the appended Figures, in which.

DETAILED DESCRIPTION OF THE INVENTION

Figure 1:
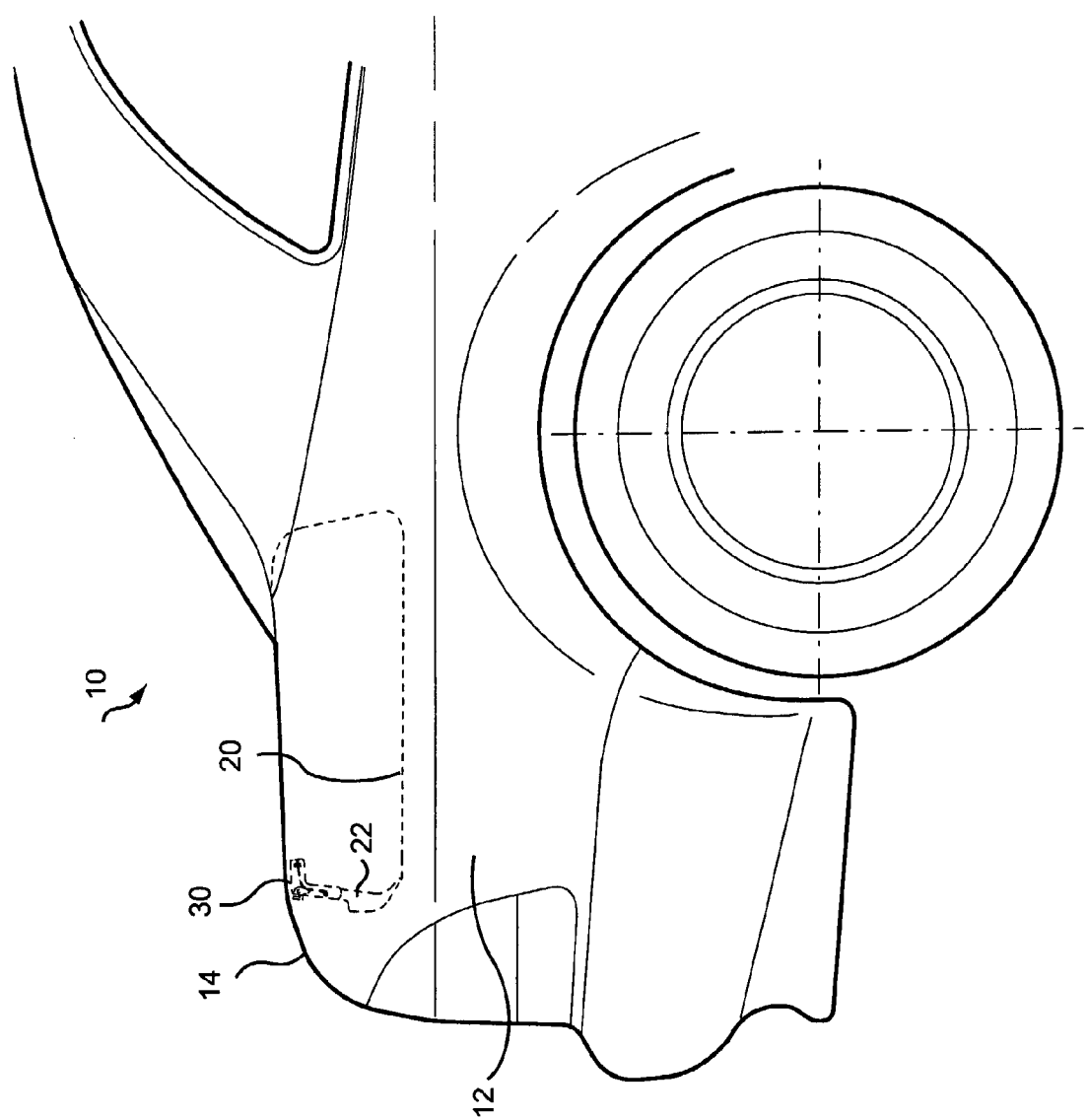
FIG. 1 shows the rear area of a vehicle, wherein a variable top receptacle and an accompanying actuation device according to the invention are indicated.

FIG. 1 shows the rear area 10 of a motor vehicle. A top receptacle 20, which is indicated in FIG. 1 with dashed lines, is disposed in the interior of the rear space, more particularly in the trunk 12. The top receptacle 20 is borne on the rear lid 14. In addition, the top receptacle 20 is movable between a first position, which is illustrated in FIG. 1, in which position it is prepared to accommodate a flap- or folding roof, and a second position (not illustrated), in which position it lays flat adjacent to the rear lid 14 in a folded-together manner, such that the trunk 12 can offer as much storage space as possible for luggage pieces and the like. The construction of the top receptacle 20 from a plurality of wall elements, which are hingedly connected with each other, is known.

An actuation mechanism 30 for the top receptacle 20 is mounted on one of the wall elements and/or on a flap element connected with a wall element in order to move the top receptacle 20 between the first and the second position. The actuation mechanism 30 thus serves, in particular, to assist the movement of the top receptacle 20. The movement is released, e.g., manually by means of a lever or a grip or by a not-illustrated electronic actuation.

Figure 2:
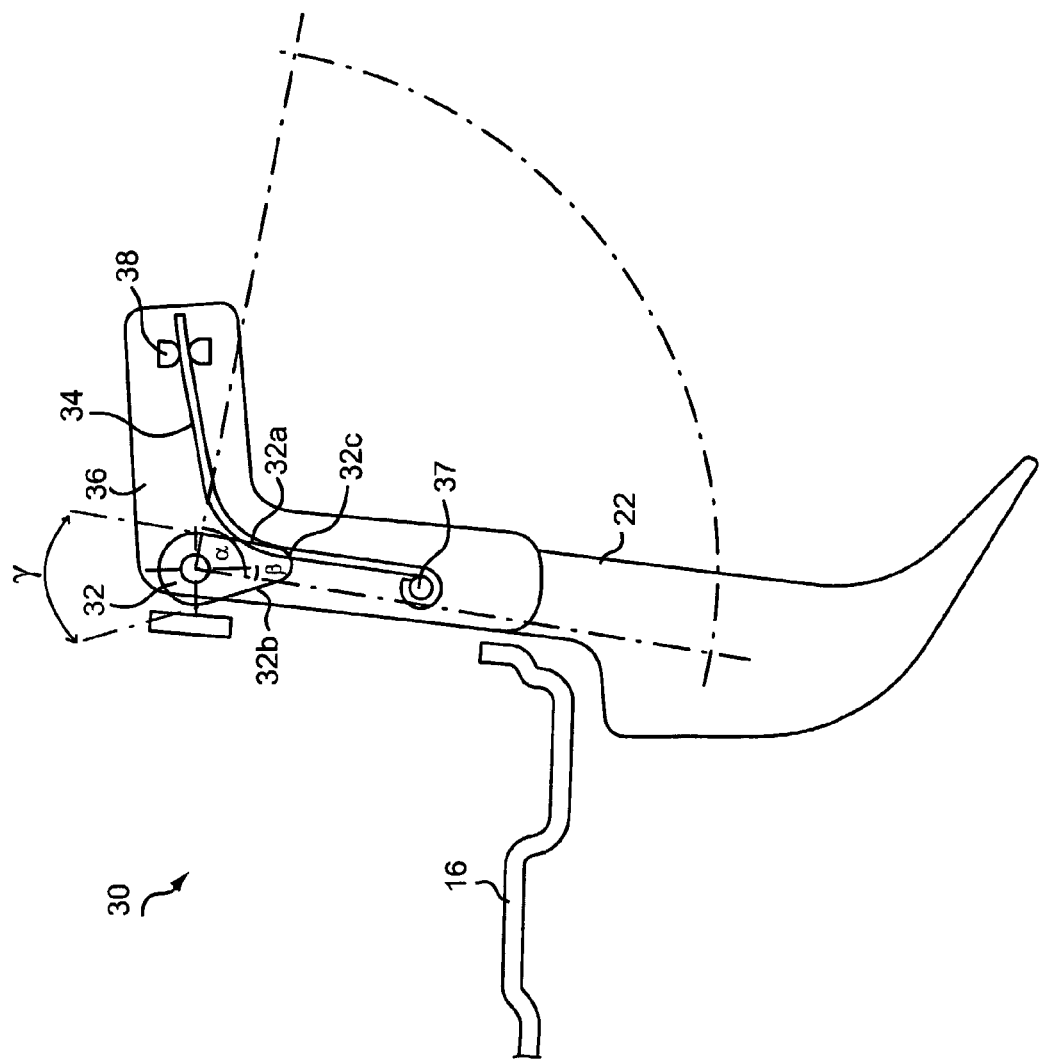
FIG. 2 shows an embodiment of the inventive actuation device in the first position.
Figure 3:
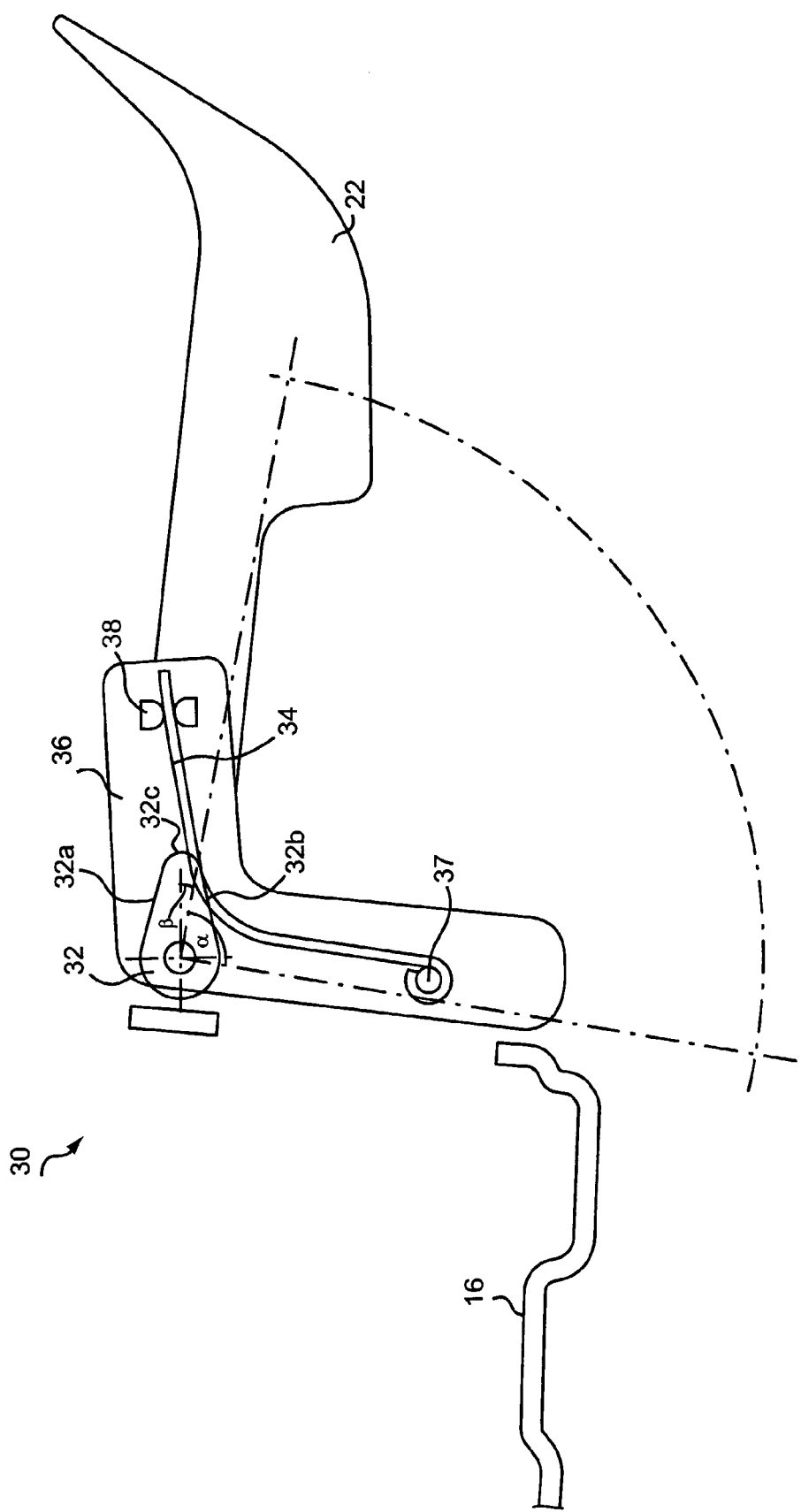
FIG. 3 shows the actuation device of FIG. 2 in the second position.

In the following, the actuation mechanism 30 for the top receptacle will be explained with reference to FIGS. 2 and 3. FIG. 2 shows the actuation mechanism 30 in the first position (low position of the rear receptacle, which corresponds to the illustration in FIG. 1) and FIG. 3 shows the actuation mechanism 30 in the second position (high position of the top receptacle, folded-together top receptacle position). The actuation device 30 comprises a wall- or flap element 22 of the top receptacle 20, which element is either intrinsically formed by a wall element of the top receptacle or is mounted on such a wall element as a lever-like element. The wall element 22 of the top receptacle is pivotable about the angle α between the first position and a second position, which angle is bounded by the connection lines in the first and in the second position, respectively, between the center of gravity of the wall element and its center of rotation.

A cam-shaped lever element 32 is provided on the wall element 22. The lever element 32 is rigidly connected with the wall element 22 at the pivot axis of the wall element and protrudes from the wall element 22 in a direction perpendicular to the pivoting plane of the wall element 22 (the direction perpendicular to the plane of the drawing in FIGS. 2 and 3). The lever element is provided with two substantially planar side surfaces 32a, 32b that lie perpendicular to the plane of the pivoting movement and define an angle γ, preferably 0°≦γ≦90°. The two side surfaces 32a, 32b are connected by a curved surface 32c (circular cylinder segment) that likewise lies perpendicular to the plane of rotation, so that a pointed, sharp-edged junction between the side surfaces 32a, 32b is not provided.

Furthermore, the lever element 32 is oriented such that it is in contact with a leaf spring 34, which is fixedly borne in a clamped manner, on one of the side surfaces 32a, 32b in the first end position as well as in the second end position (FIG. 3). For this purpose, the lever element 32 is offset relative to the flap element 22 by an angle β. This leads to a first side wall surface 32a of the lever element 32 being in contact with the leaf spring in the first position (FIG. 2) and a side wall surface 32b of the lever element 32 that opposes the first side wall surface 32a contacting the leaf spring 34 in the second position.

A bracket 36 is provided between the wall element 22 and the lever element 32 in the illustrated embodiment, which bracket 36 is substantially L-shaped in the top view of FIGS. 2 and 3 and is fixedly borne, i.e. translationally and rotationally unmovable, on the vehicle chassis, e.g., on the rear lid 14. Thus, during a pivoting movement of the wall element 22 and the lever element 32, the bracket 36 does not pivot therewith. The leaf spring 34 is affixed to the bracket 36 at a first connection point 37. It is designed as a strip-shaped leaf spring 34, wherein its opposing end is accommodated in a guide 38 so as to be displaceable in the longitudinal direction, so that a portion of the leaf spring 34 remains in the guide and does not shift similar to the free end of a fixed beam when the leaf spring 34 is pressed by the lever element 32 during the pivoting movement of the wall element 22. Rather, only an elastic flexing of the leaf spring 34 is possible. The strip-shaped leaf spring 34 substantially conforms to the shape of the bracket 36, i.e. it is also L-shaped and/or curved. The leaf spring 34 is preferably curved such that its radius of curvature is opposite to the curvature of the junction region 32c of the lever element 32. The bracket 36 and likewise the leaf spring 34 are, however, not limited to the illustrated shapes. To the contrary, all shapes are conceivable for the bracket 36 as well as for the spring element 34, as long as the desired interaction with the lever element 32 and/or the wall element 22 is possible. The shape and the form of the lever element 32, the bracket 36, the wall element 32 as well as the leaf spring 34 are thereby adapted to the neighboring vehicle components, such as e.g. a panel 16, so that they do not strike or hit the neighboring components when moving.

For changing the position of the variable top receptacle, i.e. the wall elements and the elements connected thereto, which top receptacle is not illustrated in FIGS. 2 and 3, the movement of the top receptacle is initiated, e.g., manually or with electronic assistance. For this purpose, e.g., a grip is pivoted, which grip is mounted on a wall element of the top receptacle 20, and consequently a first movement path is traversed.

For example, the wall element 22 is pivoted from the position illustrated in FIG. 2 in the counter-clockwise direction. By the pivoting of the wall element 22, the lever element 32 is moved and pivoted therewith, wherein its side wall 32a hits against the spring element, which is formed as leaf spring 34, on one of the legs of the leaf spring 34 and remains in contact during the pivoting movement. During a continuing pivoting movement in the counter-clockwise direction, the leaf spring 34 is thus deformed, wherein its restoring force increases up to a point of maximum deflection. In this first pivoting range, which extends from the position illustrated in FIG. 2 until approximately a position aligned with the bisecting line of the pivot angle α, the restoring force, which acts on the lever element 32 and thus the wall element 32, continuously increases, wherein this restoring force urges the wall element 22 back towards the first position (FIG. 2). When the point of maximum deflection (dead point) is overcome by a continuing pivoting movement, at which point the connecting line between the center of rotation of the lever element and its contacting point on the leaf spring lies perpendicular to a tangent on the leaf spring, the second side surface 32b of the lever element 32 arrives in contact with the leaf spring. The circular arc-shaped side wall surface 32c serves to ensure a uniform movement within this junction range. This circular arc shape in the junction region prevents an excessive increase of the force to be overcome during the continuing pivotable movement of the wall element 22.

In the second half of the movement path, i.e. the part of the movement path of the wall element 22 that lies between the bisecting line of the angle α and the second end position of the wall element 22, the now diminishing restoring force of the leaf spring 34 acts to further assist the pivoting movement during continuing pivoting movement. Thus, after overcoming the dead point (point of maximum deflection of the leaf spring 34), the wall element 22 is urged into the second position (FIG. 3) by the restoring force of the leaf spring without further application of force from the outside.

Since the substantially straight side wall surfaces 32a, 32b, respectively, are in contact with the leaf spring in the first as well as the second position, the actuation device 30 simultaneously serves as a securing device in order to retain the wall element 22 in the first and second positions, respectively. The straight wall surfaces 32a, 32b ensure that a certain amount of force must be applied in order to get proximal to the dead point of the leaf spring 34, so that an undesired release of the position of the wall element 22, e.g., by an impact applied to the vehicle, is prevented. This is achieved, e.g., by the straight side wall surface 32a of the lever element 32 initially being in contact with a straight section of the leaf spring 34 starting from the position illustrated in FIG. 2 and a straight side wall surface 32b of the leaf spring 34 again being in contact with a straight section of the leaf spring 34 during the end phase of the pivoting movement.

Preferably, the lever element 32 formed as such is directly mounted at the center of rotation of the wall element 22, because the lever forces can thereby be minimized.

Thus, in such an embodiment, a relatively costly construction of an actuation mechanism that is assisted by a pneumatic spring can be replaced with a simpler device that simultaneously undertakes the function of a latch in the end positions.

REFERENCE NUMBERS

10 Rear Area of a Vehicle
12 Trunk
14 Rear Lid
16 Panel
20 Top Receptacle
22 Wall Element
30 Actuation Device
32 Lever Element
32a First Side Wall Surface
32b Second Side Wall Surface
34 Leaf Spring
36 Bracket
37 Connection Point
38 Guide

The invention claimed is:

1. An actuation device for a flap element of a variable top receptacle having at least one wall element that is pivotable between a first and a second position, wherein the actuation device comprises a leaf spring that is arranged and constructed to traverse a point of maximum elastic deformation between its first and second position by interacting with the wall element during pivoting of the wall element, the leaf spring is further arranged and constructed so as to assume a substantially undeformed state in each of the first and second positions, one end of the leaf spring is stationary during pivoting of the wall element between the first and second positions and the leaf spring includes two legs connected via a curved portion arranged and curved such that its curvature lies within an angle (α) traversed by the wall element during its pivoting movement.

2. An actuation device according to claim 1, further comprising a fixed bracket, wherein the one end of the leaf spring is substantially rigidly supported on the bracket in a longitudinal direction of the leaf spring and another end of the leaf spring is movably supported in the longitudinal direction of the leaf spring.

3. An actuation device according to claim 2, wherein the middle point of a radius of curvature of the leaf spring and the pivotal axis of the wall element lie on opposite sides of the leaf spring.

4. An actuation device according to claim 3, wherein the leaf spring is arranged and constructed to cooperate with a lever element that is fixedly disposed on the wall element.

5. An actuation device according to claim 4, wherein the lever element is affixed to the wall element proximal to the pivotal axis of the wall element.

6. An actuation device according to claim 5, wherein the lever element is cam-shaped.

7. An actuation device according to claim 6, wherein the point of maximum deflection of the leaf spring lies substantially at the bisecting line of the angle (α) between the first and second positions of the wall element.

8. An actuation device according to claim 7, wherein the leaf spring elastically biases the wall element at least in one of the first position and the second position.

9. An actuation device according to claim 1, wherein a radius of curvature of the leaf spring and the pivotal axis of the wall element lie on opposite sides of the leaf spring.

10. An actuation device according to claim 1, wherein the leaf spring is arranged and constructed to cooperate with a lever element that is fixedly disposed on the wall element and the lever element is affixed to the wall element proximal to the pivotal axis of the wall element.

11. An actuation device according to claim 4, wherein the lever element is cam-shaped.

12. An actuation device according to claim 1, wherein the point of maximum deflection of the leaf spring lies substantially at the bisecting line of the angle (α) between the first and second positions of the wall element.

13. An actuation device according to claim 1, wherein the leaf spring is arranged and constructed to elastically bias the wall element at least in the first or the second position.

14. A vehicle comprising:
a stowable top movably disposed on a body of the vehicle,
a receptacle at least partially disposed in a rear portion of the vehicle body, wherein the receptacle defines a volume that is variable by pivoting a wall element thereof between a first position defining a maximum receptacle volume and a second position defining a minimum receptacle volume, wherein the receptacle is arranged and constructed to accommodate the stowable top in the first position, and
a leaf spring having a first end fixedly coupled to one of the vehicle body and a rear truck lid pivotably coupled to the vehicle body, the leaf spring being arranged and constructed to contact the wall element at least during pivoting movement of the wall element and to traverse a point of maximum elastic deformation of the leaf spring between the first and second position of the wall element, wherein the leaf spring is arranged and constructed such that the restoring force of the leaf spring is substantially at a minimum when the wall element is disposed in the first position and the second position, respectively, the first end of the leaf spring remains stationary during the pivoting movement of the wall element and the leaf spring includes two legs connected via a curved portion arranged and curved such that its curvature lies within an angle (α) traversed by the wall element during its pivoting movement.

15. A vehicle according to claim 14, further comprising a bracket fixedly mounted on a rear trunk lid, wherein the first end of the leaf spring is substantially rigidly supported on the bracket in a longitudinal direction of the leaf spring and a second end of the leaf spring is movably supported in the longitudinal direction of the leaf spring.

16. A vehicle according to claim 15, further comprising a lever element rigidly affixed to the wall element proximal to the pivotal axis of the wall element, wherein the leaf spring is arranged and constructed to be deflected by the lever element during pivoting movement of the wall element.

17. A vehicle according to claim 16, wherein the lever element is cam-shaped.

18. A device configured to, at least in part, vary the size of a convertible top receptacle comprising:

- a wall element pivotable between a first position and a second position, and
- a leaf spring interacting with the wall element, wherein the leaf spring is configured to traverse a point of maximum elastic deformation during pivoting of the wall element between the first and second positions and to assume a substantially undeformed state at each of the first and second positions of the wall element, wherein one end of the leaf spring remains stationary during pivoting of the wall element between the first and second positions and the leaf spring includes two legs connected via a curved portion arranged and curved such that its curvature lies within an angle ($\alpha$) traversed by the wall element during its pivoting movement.

* * * * *